Oct. 9, 1962  H. FRÖHLICH  3,057,795
METHOD AND DEVICE FOR IMPROVING THE COATABILITY
OF SYNTHETIC PLASTICS
Filed Feb. 12, 1960  3 Sheets-Sheet 1

United States Patent Office 3,057,795
Patented Oct. 9, 1962

3,057,795
METHOD AND DEVICE FOR IMPROVING THE COATABILITY OF SYNTHETIC PLASTICS
Heinz Fröhlich, Erlangen, Germany, assignor to Siemens-Schuckertwerke Aktiengesellschaft, Berlin-Siemensstadt, Germany, a corporation of Germany
Filed Feb. 12, 1960, Ser. No. 8,301
Claims priority, application Germany Feb. 14, 1959
7 Claims. (Cl. 204—312)

My invention relates to a method and device for improving the surface of synthetic plastics toward better adherence of printing dyes or other coatings, and constitutes an improvement over the method and means disclosed in my copending application Serial No. 782,125, filed December 22, 1958, and assigned to the assignee of the present invention.

According to the copending application, the surface texture of synthetic plastics is improved, for better adhesion quality and better imprintability, by subjecting the objects of synthetic material in vacuum to the plasma of a low-pressure gas discharge. The copending application particularly deals with the processing of synthetic foils for improving the adhesion of printing dyes.

It is an object of the present invention to provide a method, involving the principles set forth in the copending application, which is particularly suitable for surface treatment of hollow bodies made of synthetic material.

There is an urgent demand for making hollow synthetic bodies, particularly polyethylene bottles or other containers, impermeable to gas and aroma in order to preserve the substances kept in such bottles or containers. For thus sealing the surfaces, suitable varnishes may be coated upon the surfaces, particularly the inner surface of the synthetic containers, provided the coatings remain firmly adherent to the plastic material. However, varnish does not, or not sufficiently, adhere to untreated synthetic material. It has become known therefore to subject the plastic bodies to a surface-modifying pre-treatment, such as the so-called flame process according to Kreidel. Heretofore, however, such pre-treatment has not been applicable to the inner surfaces of hollow bodies. Furthermore, the application of varnish or the like sealing material upon pre-treated and imprinted external surfaces is often infeasible or unsatisfactory because of the poor adherence of varnishes on most printing dyes.

It is therefore a more specific object of my invention to devise a method and device which affords preparing in a simple manner the interior as well as the exterior surfaces of hollow bodies of synthetic plastics for the application of coatings. For example, the invention aims at treating the internal surfaces of such hollow bodies for the purpose of thereafter applying the above-mentioned sealing varnishes, and treating the external surfaces for subsequently imprinting a dye thereupon.

It has already been attempted to pre-treat the internal surfaces of hollow bodies. However, aside from exceptional cases, the known methods, including the flame method of Kreidel, are unsuitable for mass production, because it is infeasible with these methods to avoid damaging the synthetic bodies. It is therefore another object of my invention to provide a method suitable for the above-mentioned purposes that lends itself particularly well to mass production and reliably avoids damaging the objects being treated.

In order to achieve the above-mentioned objects, and in accordance with a feature of my invention, the plasma of a low-pressure gas discharge in vacuum is simultaneously made effective on the interior and exterior surfaces of hollow bodies consisting of synthetic plastic and possessing at least one opening through which the interior communicates with the vacuum. This makes it possible in simple manner to treat such synthetic hollow bodies simultaneously on the external and internal surfaces without requiring a close adaptation of the processing devices to the particular shape of the hollow bodies.

The plasma may be produced by glow discharge or high-frequency discharge or by both types of discharge simultaneously. When applying a high-frequency discharge, it may be produced by an electromagnetic field, or an electric field, or simultaneously by both.

The processing according to the invention has the further effect of liberating the surfaces on the external and internal sides from electrostatic charges so that no dust and lint particles are attracted and a clean surface is secured, particularly when the further fabrication of the synthetic hollow bodies takes place immediately thereafter. This cleanliness of the surfaces manifests itself in a particularly good quality of the finished product.

The foregoing and more specific objects, advantages and features of my invention, said features being set forth with particularity in the claims annexed hereto, will be apparent from, and will be described in, the following with reference to the embodiments of processing devices according to the invention illustrated by way of example on the accompanying drawings, in which:

In the drawings, electrically insulating parts are shown thick-hatched, and the same reference numerals are applied to corresponding components, respectively, in the various figures.

Figure 1:
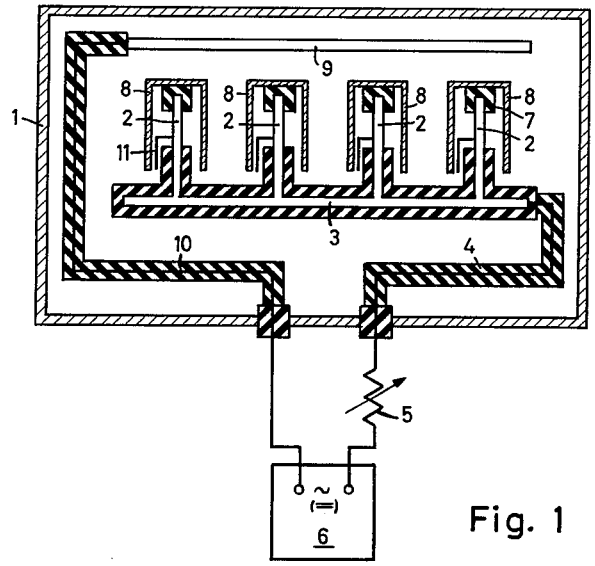
FIGS. 1, 2 and 3 illustrate in cross section, three respective processing devices operating with glow discharges.

The device illustrated in FIG. 1 comprises an enclosure 1 which forms a sealed negative-pressure chamber in which a number of pin-shaped metal electrodes 2 are mounted vertically in parallel relation to each other and are connected with each other electrically and mechanically by a common conductive carrier or bus 3. If the hollow bodies 8 to be treated have an opening of small diameter, the carrier 3 is preferably insulated as shown, and is connected by a supply lead 4, insulated within the low-pressure chamber, with a load resistor 5 located outside of the chamber which, in turn, is connected to one pole of a direct-current or alternating-current source 6. When the openings of the respective hollow bodies 8 have a large cross section, the insulation of the carrier 3 and of the conductor 4 may be dispensed with, if desired.

The individual rod electrodes 2 are preferably covered at their top ends with respective insulating caps 7, so that the synthetic hollow bodies 8 placed over the electrodes cannot come into direct contact with the electrodes, so that the bodies will not be damaged when an intensive pre-treatment is applied. If the openings of the hollow bodies have a small cross section, the junction places of the electrodes 2 with the carrier 3 are also provided with an insulating sleeve which, as shown, preferably extends into the interior space of the synthetic hollow bodies 8. The individual electrodes 2 are sufficiently spaced from each other to prevent the synthetic bodies 8, placed over these electrodes, from mutually contacting each other, thus securing a good pre-treatment of the interior and exterior surfaces of the synthetic bodies.

The device is further provided with a counter-electrode 9 which is common to all rod electrodes 2 and is preferably designed as a planar or curved area electrode or plate. The electrode plate 9, whose plane in FIG. 1 extends perpendicular to the plane of illustration, is connected by a lead 10 with the other pole of the voltage source 6, the lead 10 being insulated within the discharge chamber 1. The size of the counter-electrode 9 is so rated as to result in a best uniform contact engagement of all bodies 8 with the glow discharged.

Figure 2:
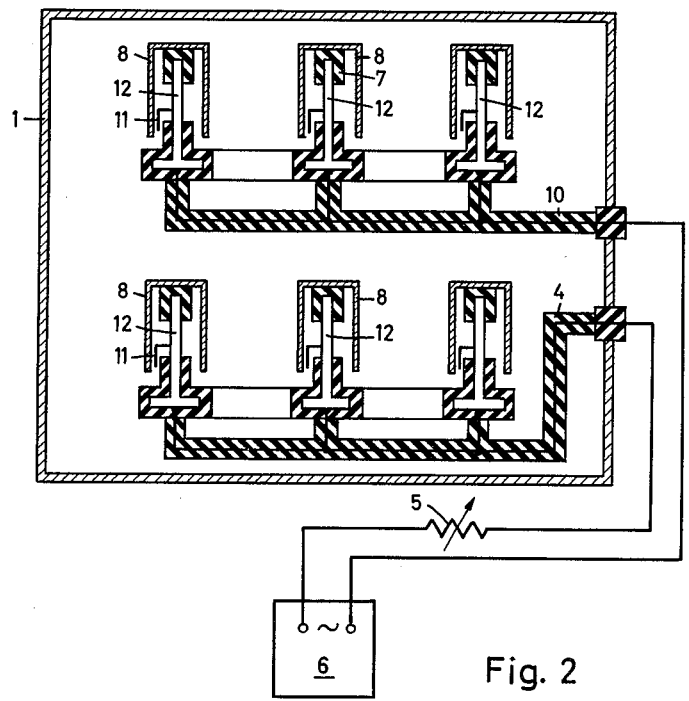
Figure 3:
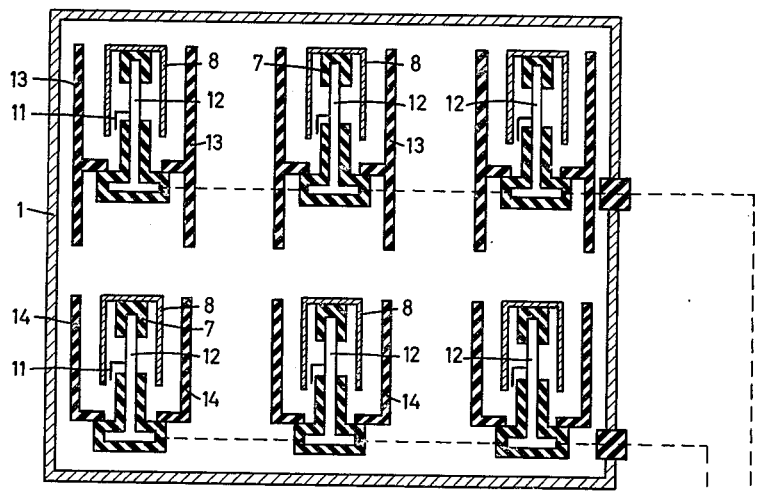

Due to the insulation of the electrodes, including the electrode leads 4, 10 and the electrode carrier 3, which leaves only a portion of the rod electrode 2 within the hollow bodies 8 exposed to the discharge space, a glow discharge passes from the rod electrodes 2 in the interior of the bodies 8 to the space surrounding the bodies 8 and to the counter-electrode 9, thus filling the interior spaces as well as the external spaces between the synthetic bodies. This takes place even if the openings of the bodies being processed have a small diameter, provided the negative pressure in enclosure 1 has the proper magnitude and the voltage impressed between the counter-electrode 9 and the rod electrodes 2 is sufficient. Suitable for operation of the device, as well as of the devices described below with reference to FIGS. 2 and 3, is in air pressure of 0.1 to 1 mm. Hg, some 100 volt tension between the electrodes, and a current density of some ma./cm.$^2$. The low-pressure glow discharge thus produced secures the above-described satisfactory processing of the interior as well as the exterior surfaces. Since the mean free path of the charge carrier in the glow discharge within the above-mentioned range of pressures is generally small in comparison with the geometric dimensions of the synthetic bodies (with the exception of narrow gaps, capillaries, and the like), the glow discharge is intimately and practically accurately in area contact with the internal and external surfaces of the bodies and thus secures a uniform pre-treatment. This makes it unnecessary to adapt the shape of the electrodes to that of the synthetic bodies. If necessary, only the length of the rod electrons 2 and their mutual spacing should approximately correspond to the size of the hollow bodies.

For the simultaneous pre-treatment of a number of hollow bodies, it is preferable to secure a uniform glow discharge in all bodies by placing only bodies of substantially the same shape and size into the negative-pressure chamber.

When using a direct-voltage source 6, it is preferable to apply negative potential to the rod electrodes 2 and to connect the common counter-electrode 9 with the positive potential. In this case, the glow discharge will commence at any one of the rod electrodes 2 and, with a sufficiently high voltage and a sufficiently small load resistor 5, the non-insulated portion of this particular rod electrode will immediately coat itself with glow-tight cathode spots. This causes the normal cathode drop to convert to the anomalous cathode drop. The glow-discharge voltage increases greatly so that the next electrode becomes effective, and the just-mentioned phenomenon is repeated until all electrodes are ignited. For reducing the necessary ignition (glow-starting) voltage, it is preferable to mount ignition electrodes 11 on the respective rod electrodes 2 in the range of the openings in the hollow bodies 8. With a sufficiently large opening cross section of the hollow bodies, the voltage increase due to the anomalous cathode drop suffices for coating the carrier and electrode pins with a skin of glow discharge without any auxiliary expedients.

When connecting the electrodes to an alternating voltage source, the current-voltage characteristic during those half-wave periods in which the rod electrodes 2 have a positive potential, has a different shape from the characteristic during the other half-wave periods, so that the glow discharge does not necessarily issue from all electrodes if the gas pressure is too high or the current density too low. However, within the above-mentioned operating conditions, the negative half-wave at the rod electrodes can be so adjusted that a satisfactory glow-discharge processing is secured in any event.

In the modified device shown in FIG. 2, the above-described common counter-electrode 9 is substituted by individual electrodes 12 whose number corresponds to that of the rod electrodes 2 and which have the same shape, size and arrangement as the rod electrodes 2. The electrodes 12 may likewise be provided with synthetic hollow bodies 8 to be processed. The performance is the same as described above with FIG. 1, except that when using an alternating voltage source 6, the current transfer is the same during both half-wave periods.

A control or modification of the processing effect for a given shape of the glow discharge can be effected by varying the gas pressure, the current intensity, the electrode shape, the mutual electrode spacing, and the period of processing time. However, in cases where particular circumstances call for it, the shape of the discharge itself can be utilized for varying the processing result. This can be done by mounting metallic or non-metallic auxiliary bodies in form of perforated plates, nets, tubes, or the like between the electrodes, and forcing the current paths of the glow discharge to extend in a given direction. Suitable as auxiliary bodies for this purpose are correspondingly shaped, insulating parts of the electrode structures themselves. This affords obtaining a good symmetry of the current direction and distribution relative to the synthetic hollow bodies to be processed.

An embodiment of the latter type is illustrated in FIG. 3. The auxiliary bodies for modifying the glow discharge are denoted by 13 and 14. They are shown to consist of insulating material and to enclose the electrodes 2, 12 as well as the synthetic bodies 8 stuck upon the electrodes. The auxiliary bodies are preferably adapted to the particular shape of the electrodes and synthetic bodies to be processed.

The discharge and the processing can be favorably influenced in the same manner as described with reference to the method disclosed in the above-mentioned copending application Serial No. 782,125, by providing the low-pressure processing space with a gas and gas dosage particularly suitable for the synthetic material to be processed. For example, oxygen is well suitable for the processing of bodies of polyethylene. The presence of oxygen in the negative-pressure chamber affords attaining a particularly good adhesion for printing dyes and a good permanence of the dye or other coating on the processed surfaces.

According to the embodiments so far described, the processing is effected by glow discharges in which the travelling time of the electrons from one electrode to the other is small relative to the cycle period of the energizing voltage, if alternating voltage is used for this purpose. A simultaneous internal and external treatment of the surfaces on the synthetic bodies placed into the negative-pressure chamber is also obtainable by means of high-frequency discharges produced either by electrical or electromagnetic alternating fields or by both types of fields simultaneously. It is then not necessary to have the electrode reach into the interior of the synthetic bodies to be treated, but suffices if the hollow bodies are disposed between the electrodes of cooperating electrode pairs or in the interior of a coil body.

Figure 4:
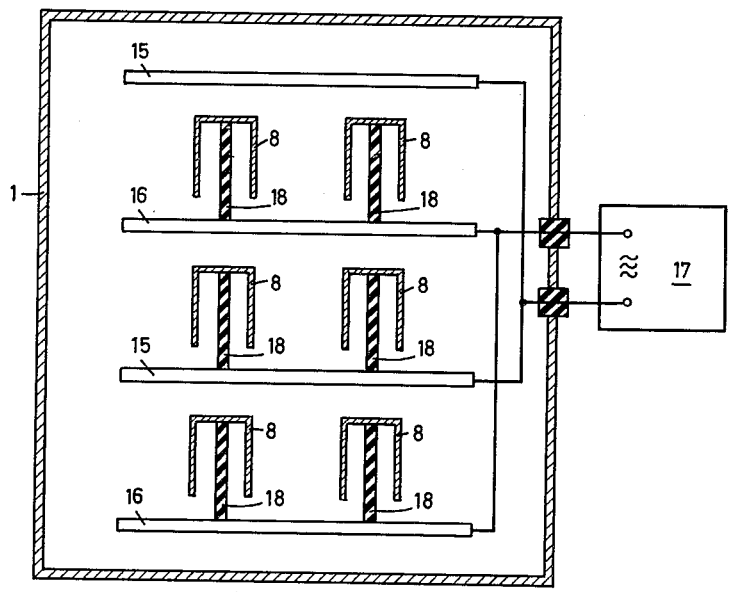
FIG. 4 illustrates in cross section, a processing device operating with an electric high-frequency discharge.

FIG. 4 illustrates an example of a device operating with an electric high-frequency discharge. The hollow bodies 8 of synthetic material are accommodated in the negative-pressure chamber of enclosure 1 between two plate-shaped electrodes 15 and 16 common for a number of hollow bodies. Connected to the cooperating electrodes 15 and 16 is the high-frequency voltage of a high-frequency generator 17. The electrodes are provided with insulating holder rods 18 upon which the hollow bodies 8 are stuck. However, the synthetic bodies to be processed may also be mounted in any other suitable manner, it being only necessary that the synthetic bodies do not directly touch each other and the electrodes.

The field strength required for the high-frequency discharge depends upon the frequency, the type of gas, and the gas pressure. For example, when operating with air at a pressure of 0.1 mm. mercury and a frequency of 40 megacycles per second, an effective field strength of 30 to 40 volt/cm. is sufficient.

Figure 5:
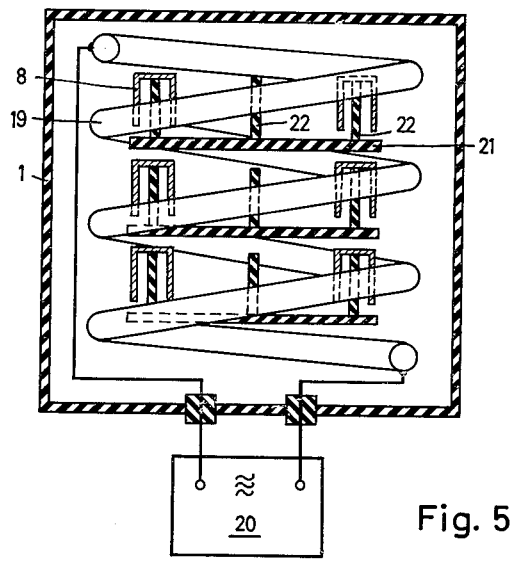
FIG. 5 illustrates in section a processing device operating with a magnetic high-frequency discharge.

The device shown in FIG. 5 operates with an electromagnetically generated high-frequency field. Mounted in the negative-pressure chamber within the container 1 are the synthetic hollow bodies 8 to be treated so that they are located within the turns of a coil 19 serving for the production of the discharge. The coil 19 forms part of an oscillatory circuit energized from a high-frequency generator 20. In lieu of a single high-frequency coil, a plurality of such coils mounted beside or above each other may be used within the same processing chamber. The bodies 8 to be processed are mounted within the coil 19 in the vicinity of the inner coil walls since the intensity of the discharge decreases in the direction toward the coil axis. The hollow bodies 8 are placed upon insulating holders 22 attached to insulating supporting plates 21, so that the bodies cannot touch each other and cannot come into touch with the turns or walls of the coil.

Figure 6:
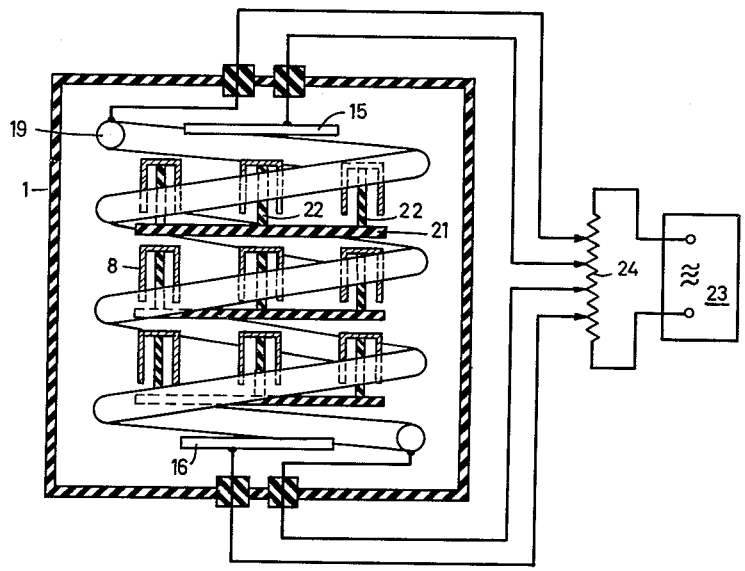
FIG. 6 illustrates in section another processing device operating with a combined electric and magnetic high-frequency discharge.

The device according to FIG. 6 operates with a combined electrical and electromagnetic high-frequency field. This affords a better space utilization of the inner coil surface because the synthetic bodies located near the coil axis are processed by the electric high-frequency field. The electrodes 15 and 16 for producing the electric high-frequency field are mounted near the upper and lower ends of the high-frequency coil 19 in parallel relation to each other. The high-frequency coil 19 and the electrodes 15, 16 are energized through lines connected to taps of a resistor 24 which is connected to a high-frequency generator 23. The performance of the device is fundamentally the same as that of the devices described above with reference to FIGS. 4 and 5, combining the processing action of both.

The invention, of course, is not limited to the illustrated embodiments. For example, a device operating with a visible glow discharge (glow light) according to FIGS. 1 to 3, may also be combined with one or both devices according to FIGS. 4, 5 and 6, by providing corresponding electrodes and coils in the negative pressure chamber within the container 1 and connecting these components with suitable energy sources. The coupling or parallel connection of a high-frequency generator with a direct-voltage source or an alternating-voltage source of normal line frequency (50 to 60 c.p.s.) is then effected in the conventional manner.

Furthermore, the electrodes or holders may be made displaceable relative to one another for adapting the device to hollow bodies of different sizes. The processing chamber may be charged with the synthetic bodies to be processed in batches, or the bodies may be intermittently or continuously passed through the processing chamber with the aid of suitable vacuum-locks and suitable conveying devices, such as described in the above-mentioned copending application, Serial No. 782,125.

Such and other modifications will be obvious to those skilled in the art, upon a study of this disclosure, so that my invention may be given embodiments other than those particularly illustrated and described herein, without departing from the essence of my invention and within the scope of the claims annexed hereto.

I claim:

1. A device for improving the adhesion-ability of hollow bodies having at least one opening, comprising an enclosure forming a negative-pressure chamber, a number of electrically interconnected glow-discharge electrodes each having an end portion of smaller thickness than the width of the body opening so as to permit passage of said portion through the opening into the interior of the body, said electrodes being spaced from one another a distance greater than the corresponding dimensions of the bodies so as to prevent the bodies, when supported by said structures, from touching one another, and counter electrode means spaced from said discharge electrodes in said chamber for producing a low-pressure glow discharge to simultaneously act upon the inner and outer surfaces of the bodies and insulating means forming part of the glow-discharge electrodes and located between said discharge means and the location of the bodies to prevent the bodies from touching the electrodes.

2. In a device according to claim 1, said counter electrode means comprising a single surface member common to all of said other electrodes.

3. In a device according to claim 1, said glow-discharge electrodes being rod-shaped and extending vertically upward in parallel relation to each other to permit the hollow bodies to be struck over said respective end portions, and said insulating means including an insulating top on each end portion contactable by the body.

4. A device for improving the adhesion-ability of hollow bodies having at least one opening, comprising an enclosure forming a negative-pressure chamber, two groups of glow-discharge electrodes, each group having a number of electrically interconnected electrode rods adapted to pass through the openings of respective hollow bodies for mounting the latter, energizing means having two current-supply conductors connected to said respective groups, said two groups being spaced from each other and the electrode rods of each group being mutually spaced to prevent the bodies from touching each other, whereby during operation the inner and outer surfaces of the bodies are subjected to the plasma of the glow discharge between said two groups.

5. In a device according to claim 1, said electrode end portions being partially covered with said insulating means and being metallically bare only inside the hollow body when in operation.

6. In a device according to claim 1, said glow-discharge electrodes having electric conductor means which interconnect said electrodes and extend from within said chamber to the outside, and said counter electrode means having conductor means also extending from within said chamber to the outside, said respective conductor means being adapted for applying discharge voltage between said discharge electrodes and said counter electrode means and having an insulating jacket which fully encloses said conductor means inside said chamber.

7. A device according to claim 1, comprising a number of ignition electrode structures each being fastened to one of said respective electrode end portions so as to be located within the hollow body when in operation.

References Cited in the file of this patent

UNITED STATES PATENTS

| | | |
|---|---|---|
| 1,888,419 | Ainsworth | Nov. 22, 1932 |
| 2,584,660 | Bancroft | Feb. 5, 1952 |
| 2,864,756 | Rothacker | Dec. 16, 1958 |
| 2,881,470 | Berthold et al. | Apr. 14, 1959 |
| 2,932,591 | Goodman | Apr. 12, 1960 |